United States Patent Office 3,714,323
Patented Jan. 30, 1973

3,714,323
METHOD OF REMOVING CARBON FROM NUCLEAR FUEL ELEMENTS IN A CLOSED SYSTEM
Gioacchino Dolci, Pisa, and Ruggero Renzoni, Milan, Italy, assignors to Snam Progetti S.p.A., Milan, Italy
Filed Jan. 26, 1970, Ser. No. 5,769
Claims priority, application Italy, Jan. 21, 1969, 11,765/69
Int. Cl. C22b 61/04
U.S. Cl. 423—4    6 Claims

ABSTRACT OF THE DISCLOSURE

Methods are disclosed for eliminating carbon from nuclear fuel elements in the reprocessing thereof in a closed system. In one embodiment, the carbon is reacted with carbon dioxide to form carbon monoxide in an attack zone which is maintained at a temperature of about 1000° C., the carbon monoxide is then caused to flow to a regeneration zone which is maintained at a lower temperature so that a reverse reaction occurs which converts the carbon monoxide into carbon dioxide and regenerated carbon, the carbon dioxide flows back to the attack zone leaving the regenerated carbon behind in the regeneration zone.

---

Figure 1:
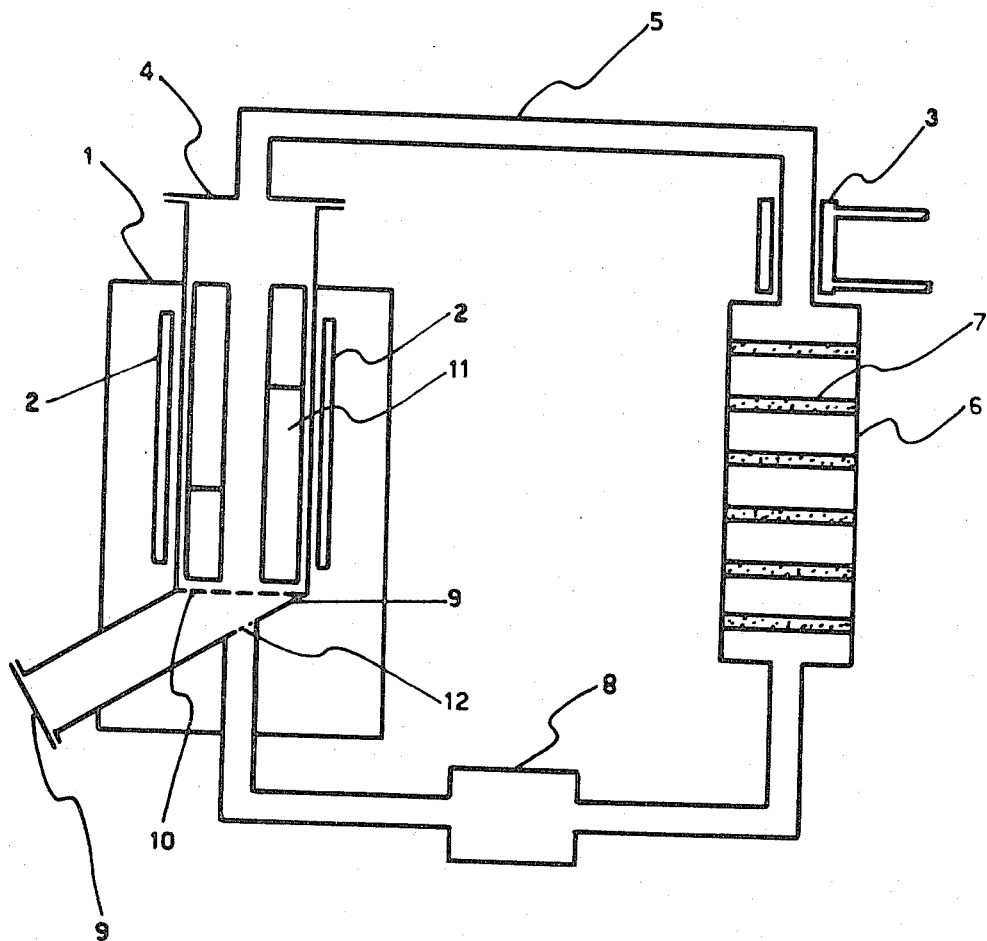

The present invention relates to a process for removing carbon, in a closed system, from a certain zone of said system to another one, by changing only the temperature and pressure conditions.

Said process may be practiced by making use of suitable catalysts or without using them.

In the reprocessing of some nuclear fuels of HTGR types (high temperature gas cooled reactors) it is necessary to separate large amounts of carbon from the active material (U, Pu, Th) which is present in the form of little spheres. This carbon constitutes the coating of the spheres, the matrix wherein they are dispersed and the structural graphite which constitute a real fuel element. The proportion by weight between active material and carbon varies from a minimum of $\frac{1}{10}$ to $\frac{1}{100}$ and more too, according to the possibility and convenience of eliminating part of structural graphite, before the effective reprocessing.

All the tested processes are subject to serious disadvantages when practiced on a large scale.

These processes may be briefly described as follows:

(A) Grinding of the whole element to obtain grains smaller than the diameter of the particles. Acid attack of the powder for recovering the active elements to be decontaminated.

(B) Combustion of the whole or ground element (fluidized bed) and acid attack of the combustion residue.

(C) Electrolytic disintegration of the element. It seems impossible to avoid the subsequent operation of combustion or of grinding, as it is not possible to have the active material free of carbon, by making use only of the tested electrolytic treatments.

(D) Volatilization process (chlorides-fluorides) of the active elements. In this case too the first step is represented by the disintegration or combustion of most of the graphite.

Without dwelling excessively in the enumeration of the serious drawbacks which all the above-mentioned processes present, it will be sufficient to note that the exceptional radio-activity of this type of element complicates tremendously any mechanical handling.

For example, process B (combustion), which is the most studied and known, implies in all its variants (air, oxygen, nitrogen oxide) the production of enormous amount of highly contaminated combination gases.

The treatment of said gases, imposes the use of various washing systems and different types of filters, all having noticeable sizes and difficult maintenance.

The further ejection to the atmosphere of filtered gases, even after large dilution, represents also a technical-economic problem of serious difficulty.

The process of the present invention, tends to eliminate completely drawbacks of this type.

According to the present invention the process for the transport of the carbon may be illustrated as follows:

Let us consider a closed system; in a zone of this system which we call "attack zone" the temperature and pressure conditions are such as to produce a reaction between the carbon and the fluid therein present.

The so formed gaseous product, by simple diffusion or by circulation, however accomplished, goes to another zone of the same system, which we call "regeneration zone."

In this zone the temperature and pressure conditions are such as to produce a reaction which is the reverse of that which took place in the "attack zone." Consequently carbon will be deposited and the attack fluid will be regenerated. In other words the system will go back to the initial state with the only difference that the transport of carbon took place (and the subsequent inevitable losses of energy). Various reversible reactions, long well known, can be differently used in our system to achieve the object of the present invention.

Therefore, in order to illustrate more particularly the present invention, some examples, i.e., a certain number of specific embodiments, are shown by way of unrestrictive example:

A first practical example of what is above-mentioned, is given by the equilibrium reactions of the system $$C + CO_2 \rightleftharpoons 2CO$$

The proportion of the two gases in equilibrium (in the presence of carbon) depends only on the pressure and on the temperature. The pressure increase shifts the equilibrium to the left (carbon is deposited) and the temperature increase shifts the equilibrium to the right (carbon is absorbed).

Therefore it is possible to adjust these two parameters in such a way that in the attack zone, the reaction may be shifted widely to the left and so that in the regeneration zone the contrary takes place.

As pointed out above, the only change due to the operation of the system is represented by the transport of carbon from one zone to another and by the inherent energy losses.

A second example is given by the reversible equilibrium reactions of the system $$C + 2H_2 \rightleftharpoons CH_4$$

Also in this case the proportion of the two gases in the presence of carbon depends on the pressure and on the temperature.

The preceding considerations are also valid, except that in this case the pressure increase shifts the reaction to the right (absorption of the carbon) and the temperature increase shifts the reaction to the left (cracking).

As a matter of fact, a result similar to that of the two above-mentioned examples, may be obtained by means of more than two reactions which may be convenient for particular reasons, provided that at the end of the cycle, the system returns to the initial state with the exception of the occurred transport of carbon, which remains always the useful object to be reached.

A practical example of the third possibility is given by the following reactions:

(1) $\quad C+H_2O=CO+H_2$
(2) $\quad CO+3H_2=H_2O+CH_4$
(3) $\quad CH_4 \rightarrow C+2H_2$ After separation of water by condensation and cracking of pure methane, the state of the system has gone back to the initial one and only the carbon has been transported.

The so-called regeneration reactions in these systems are carried out more easily and occur at a lower temperature when suitable catalysts are used.

However they are possible also without the use of said substances when prompted by economical consideration or other reasons. The reaction $2CO \rightarrow C+CO_2$ on finely divided nickel develops already entirely at 350° C. and more slowly on finely divided iron at 450° C.

The reaction $CO+3H_2=H_2O+CH_4$ is very active on nickel at 230–250° C.

The process, object of the present invention eliminates entirely the problem represented by the discharge of large amounts of contaminated gases to the atmosphere, and moreover reduces or eliminates the need of filters, as the particles of fission products which possibly pass in the zone wherein carbon is deposited, will go to waste storage.

The extraction of volatile products or fission gases, if it is necessary, will involve small amounts of gas.

One of the methods of absorbing these substances (active volatile products and fission gases, for example xenon) may be that of letting them recirculate in vessels containing deposited carbon which is finely subdivided (before separating said vessels) at low temperature and for the time necessary to determine the absorption.

In this way, these fission products can be eliminated together with carbon which goes to the discharge storage of active products. Finally the carbon consigned to the waste storage remains closed in the vessel in which it has been deposited without undergoing other manipulations other than the ones necessary for separating the vessel from the system and possibly for reducing the volume by compression. The tests carried out by us have given us quantitative data on the velocity of the various reactions in the operating conditions. Particularly on the attack of carbon with $CO_2$ our tests have pointed out a very rapid increase of the sample area (graphite density 1.6) in function of time. So that, for each temperature, the curve representing the carbon removed in function of the time increases rapidly in a non-linear way, becoming almost vertical at about the end of the operation.

This perculiarity reduces enormously the time of attack if the combustion were preceded by grinding, whose grains should reduce its dimensions in function of time.

FIG. 1 illustrates schematically, by way of example, an embodiment of the first not limitative example of our process.

In stainless steel container 4 are placed fuel elements sheathed with graphite of the type HTGR 11 or large pieces of the same. The furnace 1 keeps the container at 1000° C.

From the bottom of container 4 penetrates the $CO_2$ gas driven by blower 8 through filter 9. $CO_2$, at temperature of 1000° C., reacts with carbon forming $$CO-(CO_2+C=2CO)$$

CO, sucked by blower 8 through pipe 5 into container 6 and cooled, deposits carbon on porous material 7 and gives rise to the formation of $CO_2$, according to the reaction $$2CO \rightarrow C+CO_2$$

Blower 8 sends $CO_2$ to container 4 again, where the cycle begins again.

Filters, condensers and other devices, suitable to separate solid particles and volatile products from the gaseous fluid may be installed along the path of gases and before blower 8.

The active material (little spheres) which has not taken part in the reactions, will collect under the grid 10 and may be drawn from the opening 9.

In said FIG. 1, reference numeral 2 indicates the electric resistances of the furnace, and 3 the cooling system.

A variant of the described devices is represented by the possibility of replacing the inert porous material 7 (FIG. 1) with a suitable catalyst for the regeneration reaction $(2CO \rightarrow C+CO_2)$. The use of this catalyst makes the reaction much more rapid and complete, allowing also a considerable decrease in the operating temperature. Suitable materials for said function are the iron, nickel, cobalt and others in metallic form and in a condition of very fine division.

Said variant implies also two different possibilities of using, in case of utilization of catalysts:

(a) In one case, the carbon precipitated on the catalyst may go out from the circuit and may be sent to waste storage together with the metallic catalyst which therefore is not recovered.

Figure 2:
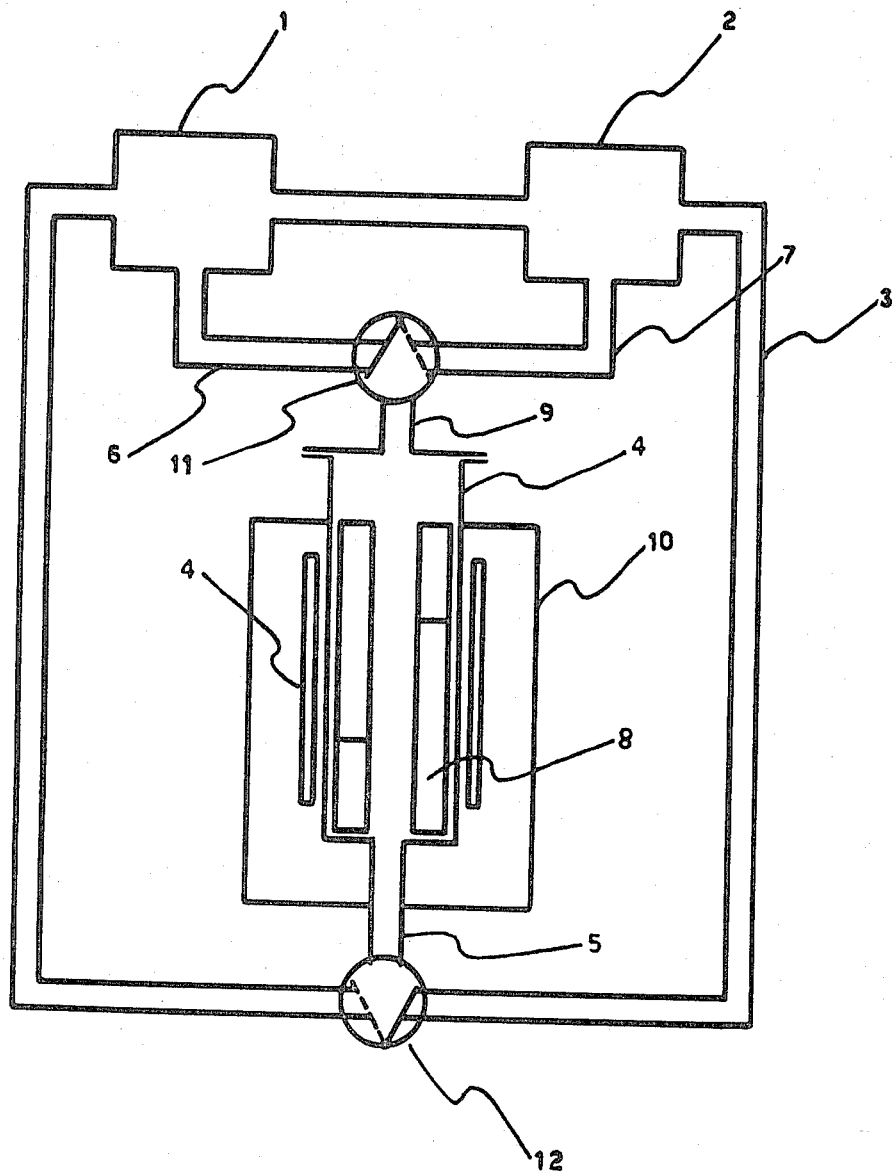

(b) In the second case the container of carbon precipitated together with the catalyst is treated for recovery of the catalyst, before being sent to waste storage of carbon. Said recovery according to the dimensions and other features of the reprocessing plant, may be of the electromechanical type (magnetic separation in case of iron) and of chemical type (iron, nickel as illustrated schematically in FIG. 2).

Conduits 3, in FIG. 2 serve to bring again the $CO_2$ alternatively to the bottom 5 of the container through valve 12 suitably open in this direction. Conduit 6 is necessary to conduct CO produced by the reaction in vessel 1 through valve 11 suitably open in that direction which in this phase is already full of nickel and of deposited carbon.

CO, at the temperature of 100° C. and at a high pressure, turns the existing nickel into nickel-carbonyl $Ni(CO)_4$. Said nickel-carbonyl decomposes in container 2, at 400° C., into Ni, 2C and $CO_2$. When container 1 becomes free of Ni, it is taken off from the system and is sent to waste storage. The new container is inserted in position 2 and by reversing the flux of CO which now flows into duct 7, and by regulating the temperatures, in said container 2 there is obtained the formation of nickel-carbonyl, which goes to decompose into the new container inserted in position 1.

In this way, alternately, the two containers accomplish the two functions: (a) to deposit carbon on Ni and (b) to transport Ni into the second container under the form of nickel-carbonyl.

Figure 3:
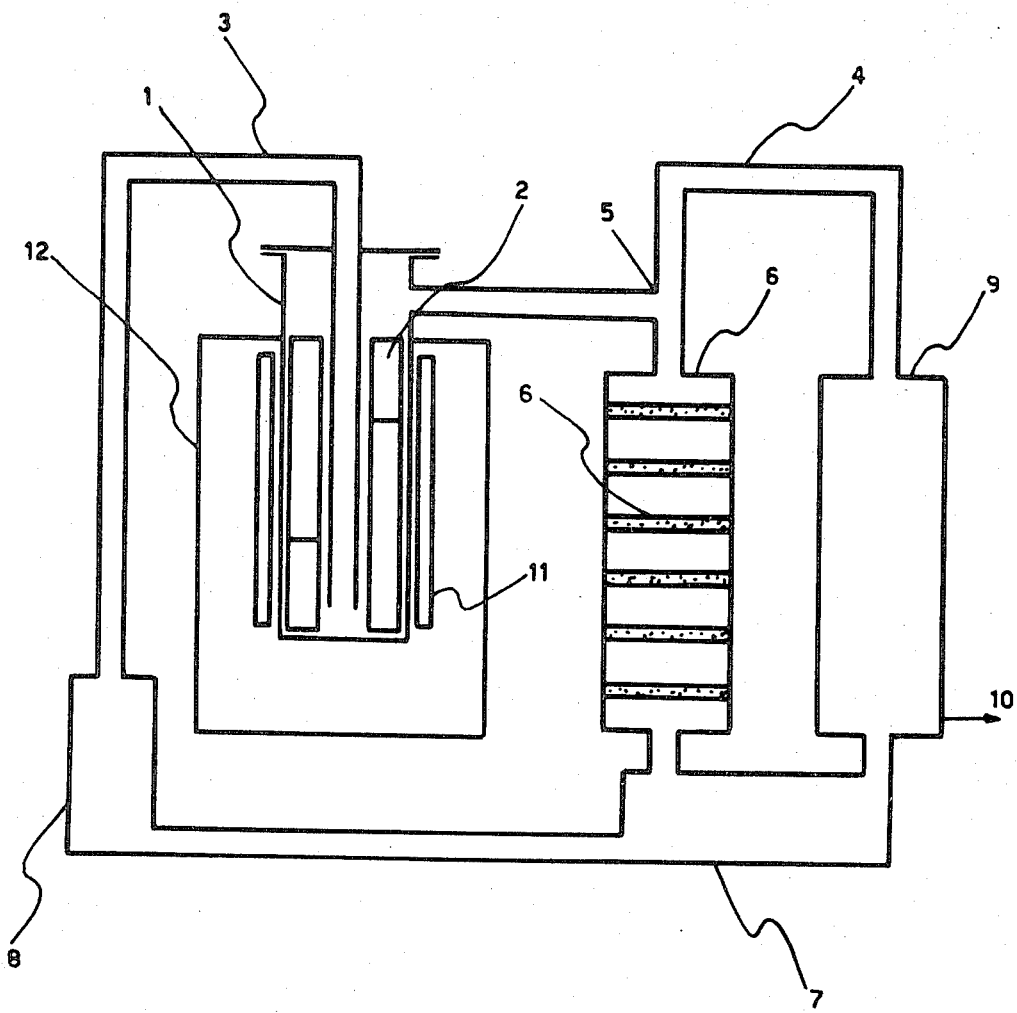

FIG. 3 shows a schematic device to illustrate the third possibility, i.e. the possibility that also with various reactions, different from the ones already indicated, the system is returned to the initial state, except for the removing of carbon which was the aim to be reached.

In vessel 1 containing carbon 2 to be attacked, steam arrives through duct 3 at temperatures between 800° C. and 1000° C. It enters the reaction with C.

$$H_2O+C=CO+H_2 \text{ at high temperature}$$
$$2H_2O+C=CO_2+2H_2 \text{ at low temperature}$$
$$3H_2O+2C=CO_2+CO+3H_2 \text{ at intermediate temperature}$$

Hydrogen and the mixture sent on finely divided nickel 6 at 250° C., are added to the so produced water gas, through pipe 4 in point 5.

In any case if H is in light excess, $CO_2$ is not formed but only $H_2O$ and $CH_4$.

A condenser 7 separates the water which goes to evaporator 8 to be recycled through 3, whereas methane (pure) is decomposed in a cracking tower 9 at temperatures between 400–800° C. into $H_2$ and C with or without catalyst. The hydrogen is recycled in 5 and carbon is sent again to waste storage 10. Also in this case the carbon container may be compressed or deformed to reduce the volume.

Although the present invention has been described in connection with a particular embodiment illustrated in the drawings, the inventive concept is susceptible of numerous other applications which will occur to people skilled in the art.

In addition, without departing from the scope of the invention, many variations may be brought to the present invention, all these variations being comprised in the above-mentioned main concepts.

What we claim is:

1. In the reprocessing of nuclear fuel elements which contain carbon in addition to active material, the method of eliminating carbon therefrom which comprises transporting said carbon from a first zone containing said nuclear fuel elements to a second zone in a closed system by causing the reaction of said carbon with carbon dioxide at a temperature of about 1000° C. to convert the same into carbon monoxide, causing said carbon monoxide to flow to the second zone, maintaining a reduced temperature in the second zone so that said reaction is reversed to convert the carbon monoxide to carbon dioxide and regenerated carbon and to deposit the regenerated carbon in said second zone, and then causing the carbon dioxide in said second zone to flow back to the first zone.

2. The method of eliminating carbon from nuclear fuel elements in a closed system as claimed in claim 1 wherein the temperature in said second zone is maintained at about 600° C.

3. The method of eliminating carbon from nuclear fuel elements in a closed system as claimed in claim 1 wherein the reaction in said second zone is conducted in the presence of a finely divided catalyst selected from the group consisting of nickel, iron and cobalt.

4. The method of eliminating carbon from a nuclear fuel element in a closed system as claimed in claim 3 wherein the catalyst is finely divided nickel and the temperature in said second zone is maintained at about 350° C.

5. The method of eliminating carbon from nuclear fuel elements in a closed system as claimed in claim 3 wherein the catalyst is finely divided iron and the temperature in said second zone is maintained at about 450° C.

6. The method of eliminating carbon from nuclear fuel elements in a closed system as claimed in claim 1 wherein the carbon regenerated in the second zone is deposited in a removable container.

References Cited

UNITED STATES PATENTS

| | | | |
|---|---|---|---|
| 1,812,230 | 6/1931 | Aarts | 23—209.5 X |
| 2,716,053 | 8/1955 | Mayland | 23—209.5 |
| 1,904,585 | 4/1933 | Willekens | 23—209.5 |
| 1,865,053 | 6/1932 | Woodruff | 23—204 |
| 2,008,270 | 7/1935 | Willekens | 23—209.5 |
| 2,464,532 | 3/1949 | Sellers | 252—417 X |
| 2,758,098 | 8/1956 | Haensel | 252—416 |
| 3,260,574 | 7/1966 | Hatch et al. | 23—324 |
| 3,453,091 | 7/1969 | Knotik et al. | 23—324 |

EDWARD J. MEROS, Primary Examiner

U.S. Cl. X.R.

423—437, 417, 415, 653, 459, 453, 19; 252—301.1 R